(12) United States Patent
Wang

(10) Patent No.: US 11,049,423 B1
(45) Date of Patent: Jun. 29, 2021

(54) DISPLAY MODULE AND ELECTRONIC DEVICE

(71) Applicant: WUHAN CHINA STAR OPTOELECTRONICS SEMICONDUCTOR DISPLAY TECHNOLOGY CO., LTD., Hubei (CN)

(72) Inventor: Kunpeng Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 453 days.

(21) Appl. No.: 16/309,731

(22) PCT Filed: Oct. 12, 2018

(86) PCT No.: PCT/CN2018/110062
§ 371 (c)(1),
(2) Date: Dec. 13, 2018

(87) PCT Pub. No.: WO2020/062339
PCT Pub. Date: Apr. 2, 2020

(30) Foreign Application Priority Data

Sep. 26, 2018 (CN) .......................... 201811122437.7

(51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC combination set(s) only.
See application file for complete search history.

(56) References Cited

U.S. PATENT DOCUMENTS

| | | | |
|---|---|---|---|
| 9,869,807 B2* | 1/2018 | Kim | H01L 23/5387 |
| 10,270,047 B2* | 4/2019 | Chen | H01L 27/3204 |
| 10,490,757 B2* | 11/2019 | Liu | G02F 1/133305 |
| 10,665,794 B2* | 5/2020 | Cao | H01L 51/5281 |
| 10,698,548 B2* | 6/2020 | Li | G06F 3/0448 |
| 10,720,475 B2* | 7/2020 | Feng | H01L 51/56 |
| 10,784,326 B2* | 9/2020 | Cao | H01L 51/5056 |
| 10,860,154 B2* | 12/2020 | Li | G06F 3/0412 |
| 10,868,263 B2* | 12/2020 | Yang | G06F 1/1652 |
| 2017/0040306 A1* | 2/2017 | Kim | H05K 1/181 |

(Continued)

FOREIGN PATENT DOCUMENTS

| | | |
|---|---|---|
| CN | 2851331 Y | 12/2006 |
| CN | 201000522 Y | 1/2008 |

(Continued)

*Primary Examiner* — Lisa Lea-Edmonds

(57) ABSTRACT

A display module and an electronic device including the display module are provided. The display module includes a backing layer, a flexible substrate, and at least one via hole. The backing layer includes a first backing plate and a second backing plate. The flexible substrate includes a first region, a second region, and a curved region. The first region corresponds to the first backing plate and the second region corresponds to the second backing plate. The at least one via hole is located in the second backing plate.

20 Claims, 2 Drawing Sheets

(56) References Cited

U.S. PATENT DOCUMENTS

| | | | |
|---|---|---|---|
| 2017/0222165 A1* | 8/2017 | Liu | G02F 1/133305 |
| 2019/0287433 A1 | 9/2019 | Huang et al. | |
| 2020/0027940 A1* | 1/2020 | Wang | H01L 27/3209 |
| 2020/0067000 A1* | 2/2020 | Li | H05K 1/0393 |

FOREIGN PATENT DOCUMENTS

| | | |
|---|---|---|
| CN | 201151222 Y | 11/2008 |
| CN | 106972030 A | 7/2017 |
| CN | 107484388 A | 12/2017 |
| CN | 207624701 U | 7/2018 |

* cited by examiner

DISPLAY MODULE AND ELECTRONIC DEVICE

FIELD OF INVENTION

The present disclosure relates to the field of display technologies, and more particularly to a display module and an electronic device.

BACKGROUND OF INVENTION

With rapid development of display technologies, flexible displays have gradually become mainstream. Commonly used flexible displays include liquid crystal display (LCD) and organic light emitting diode (OLED) displays.

Current flexible display modules include a support layer, a backing layer, and a flexible substrate. In a bonding process between the backing layer and the flexible substrate, because a driving chip binding region is disposed at one end of the flexible substrate, there is a certain height difference in the driving chip binding region. In order to avoid damage to components in the driving chip binding region, the backing layer and the flexible substrate are bonded using a step-type bonding pressure. Therefore, an uneven force on the backing layer during a bonding process causes the backing layer corresponding to the driving chip binding region to easily generate bubbles, and this reduces quality of the display module.

Therefore, there is a need to provide a display module to solve the above technical problems.

SUMMARY OF INVENTION

The present disclosure provides a display module and an electronic device to solve technical problems that bubbles are easily generated between a backing layer and a flexible substrate in a conventional display panel.

In order to solve the above technical problems, technical solutions provided by the present disclosure are as follows.

To achieve the above object, an embodiment of the present disclosure provides a display module. The display module includes a supporting layer, a backing layer, a flexible substrate, and at least one via hole. The backing layer is located on the supporting layer and includes a first backing plate and a second backing plate. The flexible substrate is located on the backing layer and includes a first region configured to arrange a pixel array, a second region, and a curved region connecting the first region and the second region. The first region corresponds to the first backing plate and the second region corresponds to the second backing plate. The at least one via hole is located in the second backing plate. A depth of the at least one via hole is not greater than a thickness of the second backing layer.

In an embodiment of the present disclosure, the at least one via hole is disposed adjacent to the flexible substrate.

In an embodiment of the present disclosure, the second backing plate includes at least one row of the at least one via hole, and each row of the at least one via hole includes at least two via holes.

In an embodiment of the present disclosure, a center spacing of any two adjacent via holes is same as on the second backing plate.

In an embodiment of the present disclosure, a shape of the at least one via hole is at least one of a triangle, a square, and a circle in a direction from the flexible substrate to the second backing plate.

In an embodiment of the present disclosure, the display module further includes optical glue disposed between the supporting layer and the backing layer, and between the flexible substrate and the backing layer.

An embodiment of the present disclosure further provides an electronic device including a display module. The display module includes a supporting layer, a backing layer, a flexible substrate, and at least one via hole. The backing layer is located on the supporting layer and includes a first backing plate and a second backing plate. The flexible substrate is located on the backing layer and includes a first region configured to arrange a pixel array, a second region, and a curved region connecting the first region and the second region. The first region corresponds to the first backing plate and the second region corresponds to the second backing plate. The at least one via hole is located in the second backing plate.

In an embodiment of the present disclosure, the at least one via hole is disposed adjacent to the flexible substrate, and a depth of the at least one via hole is not greater than a thickness of the second backing layer.

In an embodiment of the present disclosure, the second backing plate includes at least one row of the at least one via hole, and each row of the at least one via hole includes at least two via holes.

In an embodiment of the present disclosure, a center spacing of any two adjacent via holes is same as on the second backing plate.

In an embodiment of the present disclosure, a shape of the at least one via hole is at least one of a triangle, a square, and a circle in a direction from the flexible substrate to the second backing plate.

In an embodiment of the present disclosure, the display module further includes optical glue disposed between the supporting layer and the backing layer, and between the flexible substrate and the backing layer.

In an embodiment of the present disclosure, a bonding pressure between the flexible substrate and the backing layer ranges between 250 Kp and 350 Kp.

An embodiment of the present disclosure further provides a display module. The display module includes a supporting layer, a backing layer, a flexible substrate, and at least one via hole. The backing layer is located on the supporting layer and includes a first backing plate and a second backing plate. The flexible substrate is located on the backing layer and includes a first region configured to arrange a pixel array, a second region, and a curved region connecting the first region and the second region. The first region corresponds to the first backing plate and the second region corresponds to the second backing plate. The at least one via hole is located in the second backing plate.

In an embodiment of the present disclosure, the at least one via hole is disposed adjacent to the flexible substrate.

In an embodiment of the present disclosure, the second backing plate includes at least one row of the at least one via hole, and each row of the at least one via hole includes at least two via holes.

In an embodiment of the present disclosure, a center spacing of any two adjacent via holes is same as on the second backing plate.

In an embodiment of the present disclosure, a shape of the at least one via hole is at least one of a triangle, a square, and a circle in a direction from the flexible substrate to the second backing plate.

In an embodiment of the present disclosure, the display module further includes optical glue disposed between the supporting layer and the backing layer, and between the flexible substrate and the backing layer.

In an embodiment of the present disclosure, a bonding pressure between the flexible substrate and the backing layer ranges between 250 Kp and 350 Kp.

Beneficial effects of the embodiment the present disclosure are that by providing a plurality of via holes in the second backing plate, the flexible substrate and the second backing plate are bonded in a bonding process, and generated bubbles enter the via holes, this eliminates the bubbles between the flexible substrate and the second backing plate and improves quality of a display panel.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
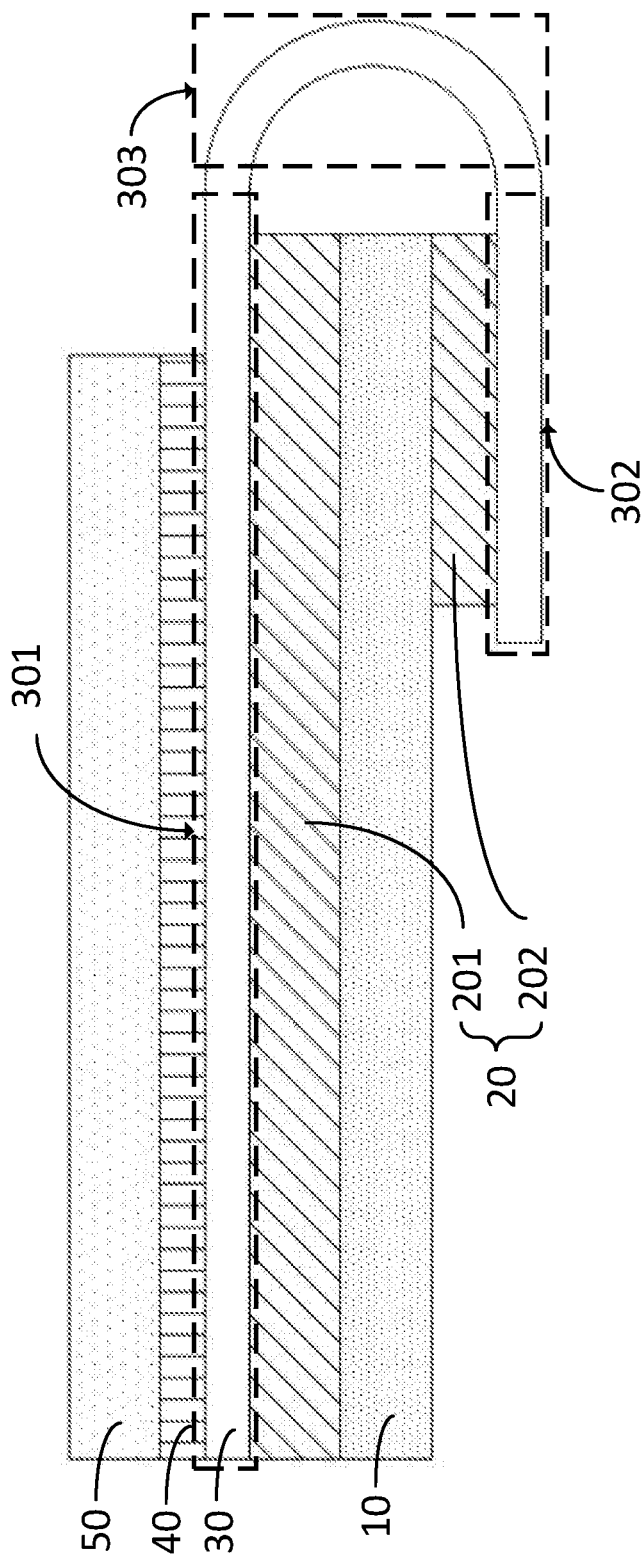
FIG. 1 is a structural diagram of a film layer of a display module according to an embodiment of the present disclosure.

The embodiments described herein with reference to the accompanying drawings are explanatory, illustrative, and used to generally understand the present disclosure. Furthermore, directional terms described by the present disclosure, such as top, bottom, front, back, left, right, inner, outer, side, etc., are only directions by referring to the accompanying drawings, and thus the used terms are used only for the purpose of describing embodiments of the present disclosure and are not intended to be limiting of the present disclosure. In the drawings, modules with similar structures are labeled with the same reference number.

Refer to FIG. 1, a structural diagram of a film layer of a display module according to an embodiment of the present disclosure is provided.

The display module includes a supporting layer 10, a backing layer 20, a flexible substrate 30, a light emitting component layer 40, and an encapsulation layer 50.

The supporting layer 10 is located on a base of the display module and is mainly used to support a structure located on the supporting layer 10.

The backing layer 20 is located on the supporting layer 10 and includes a first backing plate 201 and a second backing plate 202.

For the flexible substrate 30, since a part of a panel to which a flexible circuit board is connected is bent to an inner side of the panel, a lower frame of an electronic device is reduced, and a screen ratio is increased. In order to ensure a bending performance of a flexible panel, a corresponding backing plate of a curved region 303 needs to be removed. Therefore, a gap is included between a first backing plate 201 and a second backing plate 202. A gap region corresponds to the curved region 303 of the flexible substrate 30 to reduce a bending stress of the flexible substrate 30.

An orthographic projection of the backing layer 20 on the flexible substrate 30 is located within the flexible substrate 30. That is, an area of the flexible substrate 30 is greater than an area of the backing layer 20.

The flexible substrate 30 is located on the backing layer 20 and includes a first region 301 configured to arrange a pixel array, a second region 302, and a curved region 303 connecting the first region 301 and the second region 302. The first region 301 corresponds to the first backing plate 201 and the second region 302 corresponds to the second backing plate 202.

In one embodiment, a display panel constituting the display module is not limited to an organic light emitting diode (OLED) display panel in the present disclosure, and may be a liquid crystal display (LCD) display panel or other types of display panels, and is not limited thereto.

Figure 2:
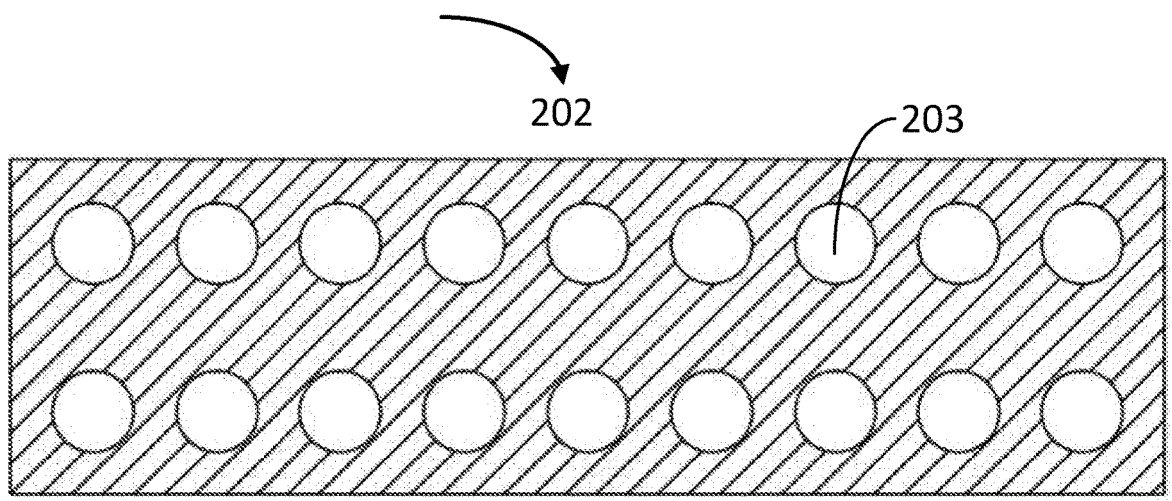
FIG. 2 is a top plan view of a second backing plate of a display module according to an embodiment of the present disclosure.

Refer to FIG. 2, a top plan view of a second backing plate of a display module according to an embodiment of the present disclosure is provided.

The second backing plate 202 further provided with a plurality of via holes 203.

Figure 3:
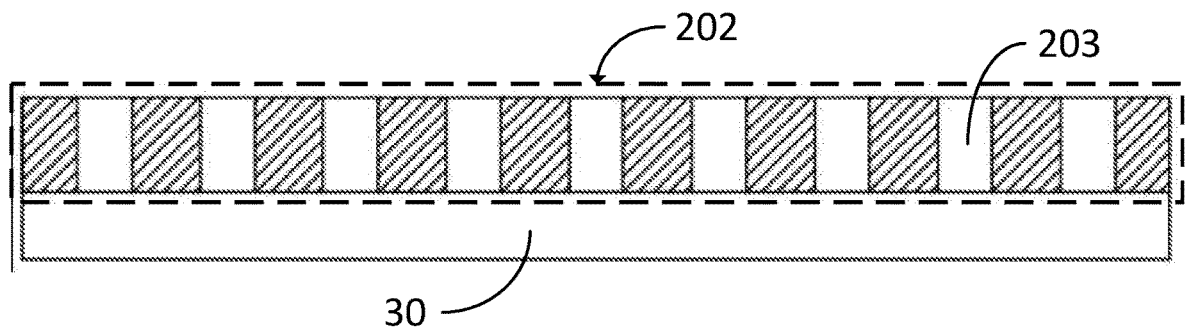
FIG. 3 is a structural diagram of a film layer of a second backing plate and a flexible substrate of a display module according to a first embodiment of the present disclosure.
Figure 4:
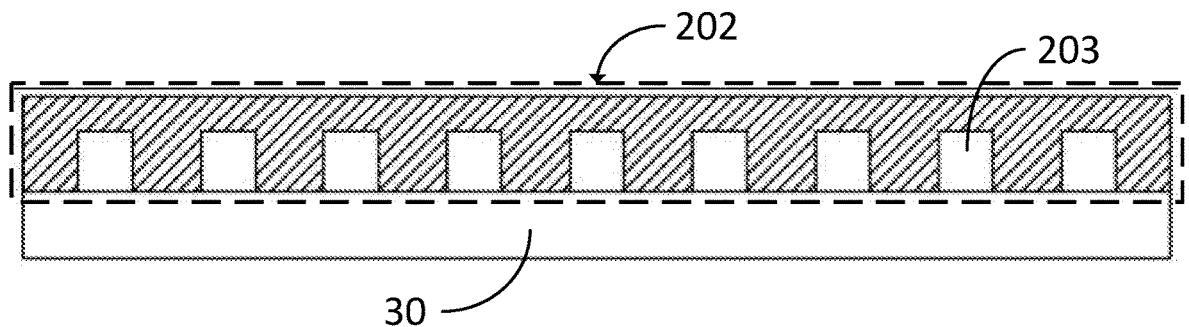
FIG. 4 is a structural diagram of a film layer of a second backing plate and a flexible substrate of a display module according to a second embodiment of the present disclosure.

Refer to FIGS. 3 and 4, the via holes 203 are disposed adjacent to the flexible substrate 30. One side of the second backing plate 202 on which the via holes 203 are disposed is connected to the flexible substrate 30.

In one embodiment, a depth of at least one via hole 203 is not greater than a thickness of the second backing layer, that is, the at least one via hole 203 may be a through hole or a blind hole.

FIG. 3 is a structural diagram of a film layer of a second backing plate and a flexible substrate of a display module according to a first embodiment of the present disclosure. The at least one via hole 203 is a through hole. A depth of the at least one via hole 203 is equal to a thickness of the second backing plate 202.

FIG. 4 is a structural diagram of a film layer of a second backing plate and a flexible substrate of a display module according to a second embodiment of the present disclosure. The at least one via hole 203 is blind hole. A depth of the at least one via hole 203 is less than a thickness of the second backing plate 202.

In one embodiment, the second backing plate 202 includes at least one row of the at least one via hole 203, and each row of the at least one via hole 203 includes at least two via holes 203.

Refer to FIG. 2, the second backing plate 202 includes at least two rows of the at least one via hole 203, and each row of the at least one via hole 203 includes multiple via holes 203. A center spacing of any two adjacent via holes 203 is same as on the second backing plate 202.

In one embodiment, a shape of the at least one via hole 203 is at least one of a triangle, a square, and a circle in a direction from the flexible substrate 30 to the second backing plate 202.

Referring to FIG. 2, in a direction of the flexible substrate 30 to the second backing plate 202, each of the via holes 203 has a circular shape, and each of the via holes 203 has a same size.

Referring to FIG. 2, a diameter of the at least one via hole 203 may be, but not limited to, 2 mm. Center spacing of any two adjacent via holes 203 may be, but is not limited to, 5 mm.

In one embodiment, the display module further includes optical glue disposed between the supporting layer 10 and the backing layer 20, and between the flexible substrate 30 and the backing layer 20. The supporting layer 10, the backing layer 20, and the flexible substrate 30 are bonded together by the optical glue.

In one embodiment, a position between a plurality of structures may be provided with, but not limited to, one type of optical glue.

In one embodiment, the display module attaches the flexible substrate 30 to the backing layer 20 using a roller.

In one embodiment, the first backing plate 201 and the second backing plate 202 are first aligned with the flexible substrate 30. Next, a bonding process of the first backing plate 201, the second backing plate 202, and the flexible substrate 30 is sequentially performed using a roller.

In one embodiment, a bonding pressure of the roller ranges between 250 Kp and 350 Kp.

In one embodiment, the display module further includes a touch layer, a polarizer layer, and a cover layer on the encapsulation layer 50. The encapsulation layer 50 is bonded to the touch layer through a first optical adhesive layer, and the polarizing layer is bonded to the cover layer through a second optical adhesive layer.

In an embodiment, the flexible substrate corresponding to the second backing plate includes a plurality of driving chip bonding regions. That is, a height difference generated by the driving chip bonding region causes bonding pressure of the second backing plate to be different, and the at least one via hole serves as a vent hole in the embodiment, such that the flexible substrate and the second backing plate are bonded in a bonding process, and generated bubbles enter the via holes, this eliminates the bubbles between the flexible substrate and the second backing plate and improves quality of a display panel.

The present disclosure also provides an electronic device including the display module. Refer to FIG. 1, a structural diagram of a film layer of a display module according to an embodiment of the present disclosure is provided.

The display module includes a supporting layer 10, a backing layer 20, and a flexible substrate 30.

The supporting layer 10 is located on a base of the display module and is mainly used to support a structure located on the supporting layer 10.

The backing layer 20 is located on the supporting layer 10 and includes a first backing plate 201 and a second backing plate 202.

For the flexible substrate 30, since a part of a panel to which a flexible circuit board is connected is bent to an inner side of the panel, a lower frame of an electronic device is reduced, and a screen ratio is increased. In order to ensure a bending performance of a flexible panel, a corresponding backing plate of a curved region 303 needs to be removed. Therefore, a gap is included between a first backing plate 201 and a second backing plate 202. A gap region corresponds to the curved region 303 of the flexible substrate 30 to reduce a bending stress of the flexible substrate 30.

An orthographic projection of the backing layer 20 on the flexible substrate 30 is located within the flexible substrate 30. That is, an area of the flexible substrate 30 is greater than an area of the backing layer 20.

The flexible substrate 30 is located on the backing layer 20 and includes a first region 301 configured to arrange a pixel array, a second region 302, and a curved region 303 connecting the first region 301 and the second region 302.

The first region 301 corresponds to the first backing plate 201 and the second region 302 corresponds to the second backing plate 202.

In one embodiment, a display panel constituting the display module is not limited to an organic light emitting diode (OLED) display panel in the present disclosure, and may be a liquid crystal display (LCD) display panel or other types of display panels, and is not limited thereto.

Refer to FIG. 2, a top plan view of a second backing plate of a display module according to an embodiment of the present disclosure is provided.

The second backing plate 202 further provided with a plurality of via holes 203.

Referring to FIGS. 3 and 4, the via holes 203 are disposed adjacent to the flexible substrate 30. One side of the second backing plate 202 on which the via holes 203 are disposed is connected to the flexible substrate 30.

In one embodiment, a depth of the at least one via hole 203 is not greater than a thickness of the second backing layer, that is, the at least one via hole 203 may be a through hole or a blind hole.

FIG. 3 is a structural diagram of a film layer of a second backing plate and a flexible substrate of a display module according to a first embodiment of the present disclosure. The at least one via hole 203 is a through hole. A depth of the at least one via hole 203 is equal to a thickness of the second backing plate 202.

FIG. 4 is a structural diagram of a film layer of a second backing plate and a flexible substrate of a display module according to a second embodiment of the present disclosure. The at least one via hole 203 is blind hole. A depth of the at least one via hole 203 is less than a thickness of the second backing plate 202.

In one embodiment, the second backing plate 202 includes at least one row of the at least one via hole 203, and each row of the at least one via hole 203 includes at least two via holes 203.

Referring to FIG. 2, the second backing plate 202 includes at least two rows of the at least one via hole 203, and each row of the at least one via hole 203 includes multiple via holes 203. A center spacing of any two adjacent via holes 203 is same as on the second backing plate 202.

In one embodiment, a shape of the at least one via hole 203 is at least one of a triangle, a square, and a circle in a direction from the flexible substrate 30 to the second backing plate 202.

Referring to FIG. 2, in a direction of the flexible substrate 30 to the second backing plate 202, each of the via holes 203 has a circular shape, and each of the via holes 203 has a same size.

Referring to FIG. 2, a diameter of the at least one via hole 203 may be, but not limited to, 2 mm. Center spacing of any two adjacent via holes 203 may be, but is not limited to, 5 mm.

In one embodiment, the display module further includes optical glue disposed between the supporting layer 10 and the backing layer 20, and between the flexible substrate 30 and the backing layer 20. The supporting layer 10, the backing layer 20, and the flexible substrate 30 are bonded together by the optical glue.

In one embodiment, a position between a plurality of structures may be provided with, but not limited to, one type of optical glue.

In one embodiment, the display module attaches the flexible substrate 30 to the backing layer 20 using a roller.

In one embodiment, the first backing plate 201 and the second backing plate 202 are first aligned with the flexible substrate 30. Next, a bonding process of the first backing plate 201, the second backing plate 202, and the flexible substrate 30 is sequentially performed using a roller.

In one embodiment, a bonding pressure of the roller ranges between 250 Kp and 350 Kp.

It can be understood that the electronic device in the present disclosure includes, but is not limited to, a mobile phone, a tablet computer, a computer display, a game machine, a television, a display screen, a wearable device, and other living appliances or household appliances having a display function.

An embodiment of the present disclosure provides a display module and an electronic device including the display module. The display module includes a supporting layer, a backing layer, a flexible substrate, and at least one via hole. The backing layer is located on the supporting layer and includes a first backing plate and a second backing plate. The flexible substrate is located on the backing layer and includes a first region configured to arrange a pixel array, a second region, and a curved region connecting the first region and the second region. The first region corresponds to the first backing plate and the second region corresponds to the second backing plate. The at least one via hole is located in the second backing plate. In the embodiment of the present disclosure, by providing a plurality of via holes in the second backing plate, the flexible substrate and the second backing plate are bonded in a bonding process, and generated bubbles enter the via holes, this eliminates the bubbles between the flexible substrate and the second backing plate and improves quality of a display panel.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components, the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The above descriptions are merely preferred implementations of the present disclosure, it should be noted that those of ordinary skill in the art can make a variety of improvements and substitutions on the premise of not deviating from the technical principle of the present disclosure, and these improvements and substitutions should be encompassed within the protection scope of the present disclosure.

The invention claimed is:
1. A display module, comprising:
   a supporting layer;
   a backing layer located on the supporting layer and comprising a first backing plate and a second backing plate;
   a flexible substrate located on the backing layer and comprising a first region configured to arrange a pixel array, a second region, and a curved region connecting the first region and the second region, wherein the first region corresponds to the first backing plate and the second region corresponds to the second backing plate; and
   at least one via hole located in the second backing plate, wherein a depth of the at least one via hole is not greater than a thickness of the second backing layer.

2. The display module according to claim 1, wherein the at least one via hole is disposed adjacent to the flexible substrate.

3. The display module according to claim 2, wherein the second backing plate comprises at least one row of the at least one via hole, and each row of the at least one via hole comprises at least two via holes.

4. The display module according to claim 3, wherein a center spacing of any two adjacent via holes is same as on the second backing plate.

5. The display module according to claim 2, wherein a shape of the at least one via hole is at least one of a triangle, a square, and a circle in a direction from the flexible substrate to the second backing plate.

6. The display module according to claim 2, further comprising optical glue disposed between the supporting layer and the backing layer, and between the flexible substrate and the backing layer.

7. An electronic device comprising a display module, wherein the display module comprises:
   a supporting layer;
   a backing layer located on the supporting layer and comprising a first backing plate and a second backing plate;
   a flexible substrate located on the backing layer and comprising a first region configured to arrange a pixel array, a second region, and a curved region connecting the first region and the second region, wherein the first region corresponds to the first backing plate and the second region corresponds to the second backing plate; and
   at least one via hole located in the second backing plate.

8. The electronic device according to claim 7, wherein the at least one via hole is disposed adjacent to the flexible substrate, and a depth of the at least one via hole is not greater than a thickness of the second backing layer.

9. The electronic device according to claim 8, wherein the second backing plate comprises at least one row of the at least one via hole, and each row of the at least one via hole comprises at least two via holes.

10. The electronic device according to claim 9, wherein a center spacing of any two adjacent via holes is same as on the second backing plate.

11. The electronic device according to claim 8, wherein a shape of the at least one via hole is at least one of a triangle, a square, and a circle in a direction from the flexible substrate to the second backing plate.

12. The electronic device according to claim 8, wherein the display module further comprises optical glue disposed between the supporting layer and the backing layer, and between the flexible substrate and the backing layer.

13. The electronic device according to claim 7, wherein a bonding pressure between the flexible substrate and the backing layer ranges between 250 Kp and 350 Kp.

14. A display module, comprising:
a supporting layer;
a backing layer located on the supporting layer and comprising a first backing plate and a second backing plate;
a flexible substrate located on the backing layer and comprising a first region configured to arrange a pixel array, a second region, and a curved region connecting the first region and the second region, wherein the first region corresponds to the first backing plate and the second region corresponds to the second backing plate; and
at least one via hole located in the second backing plate.

15. The display module according to claim 14, wherein the at least one via hole is disposed adjacent to the flexible substrate.

16. The display module according to claim 15, wherein the second backing plate comprises at least one row of the at least one via hole, and each row of the at least one via hole comprises at least two via holes.

17. The display module according to claim 16, wherein a center spacing of any two adjacent via holes is same as on the second backing plate.

18. The display module according to claim 15, wherein a shape of the at least one via hole is at least one of a triangle, a square, and a circle in a direction from the flexible substrate to the second backing plate.

19. The display module according to claim 15, further comprising optical glue disposed between the supporting layer and the backing layer, and between the flexible substrate and the backing layer.

20. The display module according to claim 14, wherein a bonding pressure between the flexible substrate and the backing layer ranges between 250 Kp and 350 Kp.

* * * * *